United States Patent
Ledbetter et al.

(10) Patent No.: US 10,540,371 B2
(45) Date of Patent: Jan. 21, 2020

(54) SYSTEMS AND METHODS FOR SYNCHRONIZING DATABASE SCHEMA

(71) Applicant: Walmart Apollo, LLC, Bentonville, AR (US)

(72) Inventors: Joshua Ledbetter, Bentonville, AR (US); Daniel Bryan Austin, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 58 days.

(21) Appl. No.: 15/724,333

(22) Filed: Oct. 4, 2017

(65) Prior Publication Data

US 2018/0096043 A1 Apr. 5, 2018

Related U.S. Application Data

(60) Provisional application No. 62/404,349, filed on Oct. 5, 2016.

(51) Int. Cl.
  *G06F 7/00* (2006.01)
  *G06F 16/27* (2019.01)
  *G06F 16/21* (2019.01)
  *G06F 16/23* (2019.01)

(52) U.S. Cl.
  CPC ............ *G06F 16/27* (2019.01); *G06F 16/213* (2019.01); *G06F 16/2379* (2019.01)

(58) Field of Classification Search
  CPC .................................................... G06F 16/27
  See application file for complete search history.

(56) References Cited

U.S. PATENT DOCUMENTS

| | | |
|---|---|---|
| 5,684,990 A | 11/1997 | Boothby |
| 5,745,753 A | 4/1998 | Mosher, Jr. |
| 6,212,530 B1 | 4/2001 | Kadlec |
| 6,453,322 B1 | 9/2002 | DeKimpe et al. |
| 6,490,590 B1 | 12/2002 | Fink |
| 7,603,339 B2 | 10/2009 | Cruanes et al. |
| 7,730,028 B2 | 6/2010 | Tysowski et al. |

(Continued)

FOREIGN PATENT DOCUMENTS

WO  WO 2018/053117 A1  3/2018

OTHER PUBLICATIONS

Application and Filing Receipt for U.S. Appl. No. 15/938,825, filed Mar. 28, 2018, Inventor(s): Austin et al.

(Continued)

*Primary Examiner* — Ajith Jacob
(74) *Attorney, Agent, or Firm* — Patterson Thuente Pedersen, P.A.

(57) ABSTRACT

Methods and systems for synchronizing a database schema (or data structure) of a source database to a target database are disclosed. A source data structure definition is generated, including definitions of each object in the source database structure. A target database structure is generated, including definitions of each object in the source database structure. Object definitions are compared between the source database structure and the target database structure. A data definition language change instruction sequence is generated that, when executed, will modify the target database structure to correspond to the data structure definition. The change instruction sequence is executed on the target database.

20 Claims, 6 Drawing Sheets

(56) References Cited

U.S. PATENT DOCUMENTS

| | | | |
|---|---|---|---|
| 7,809,763 B2* | 10/2010 | Nori | G06F 16/213 707/802 |
| 7,953,744 B2 | 5/2011 | Gharat et al. | |
| 8,176,475 B2* | 5/2012 | Kosche | G06F 11/3447 717/127 |
| 8,245,183 B2 | 8/2012 | Iborra et al. | |
| 8,577,927 B2 | 11/2013 | Fabret et al. | |
| 8,909,599 B2 | 12/2014 | Khaladkar et al. | |
| 8,924,398 B2 | 12/2014 | Garza et al. | |
| 9,171,051 B2 | 10/2015 | Raghunathan et al. | |
| 9,305,070 B2 | 4/2016 | Zhu et al. | |
| 9,367,597 B2 | 6/2016 | Behuria et al. | |
| 9,430,505 B2 | 8/2016 | Padmanabhan et al. | |
| 2005/0149582 A1 | 7/2005 | Wissmann et al. | |
| 2005/0197807 A1 | 9/2005 | Nelson et al. | |
| 2008/0168081 A1 | 7/2008 | Gaurav et al. | |
| 2011/0185136 A1 | 7/2011 | Gavrilov et al. | |
| 2013/0117232 A1 | 5/2013 | Lee et al. | |
| 2014/0040203 A1 | 2/2014 | Lu et al. | |
| 2017/0206256 A1 | 7/2017 | Tsirogiannis et al. | |
| 2019/0155801 A1 | 5/2019 | Karunanithi et al. | |

OTHER PUBLICATIONS

Dataedo; Datado—Document your databases—Data Dictonary & ERD; https://dataedo.com/ [retrieved Nov. 26, 2018]; 8 pages.

Database Documentation Generator for SQL Server | SQL Doc; https://www.red-gate.com/products/sql-development/sql-doc/; [retrieved Nov. 26, 2018]; 6 pages.

International Search Report and Written Opinion, 8 pages, dated Aug. 16, 2018 from International PCT Application No. PCT/US2018/000171.

International Search Report and Written Opinion, 18 pages, dated Dec. 12, 2017 from International PCT Application No. PCT/US2017/055017.

U.S. Appl. No. 15/724,333.

\* cited by examiner

| Object | Comparison Attribute | On Source | On Target | Additional Criteria | Action |
|---|---|---|---|---|---|
| Database | Database name | Yes | No | | CREATE DATABASE |
| | | Yes | Yes | | Compare database objects |
| Sequence | Sequence Name | Yes | No | | CREATE SEQUENCE |
| | | No | Yes | | DROP SEQUENCE |
| | | Yes | Yes | Increment by, max value, min value, cycle, cache or order MISMATCH | ALTER SEQUENCE |
| Synonym | Synonym name | Yes | No | | CREATE SYNONYM |
| | | No | Yes | | DROP SYNONYM |
| | | Yes | Yes | Owner, type, table, remote db, remote owner or remote table MISMATCH | DROP SYNONYM; CREATE SYNONYM |
| View | View name | Yes | No | | CREATE VIEW |
| | | No | Yes | | DROP VIEW |
| | | Yes | Yes | SQL checksum MISMATCH | DROP VIEW; CREATE VIEW |
| Procedure | Proc name + parameters | Yes | No | | CREATE PROCEDURE |
| | | No | Yes | | DROP PROCEDURE |
| | | Yes | Yes | SQL checksum MISMATCH | DROP PROCEDURE; CREATE PROCEDURE |
| Table | Table name | Yes | No | | CREATE TABLE |
| | | No | Yes | | DROP TABLE |
| | | Yes | Yes | Next extent or lock level MISMATCH | MODIFY TABLE; Compare table objects |
| | | Yes | Yes | Definition matches | Compare table objects |
| Column | Column name | Yes | No | | ADD COLUMN |
| | | No | Yes | | DROP COLUMN |
| | | Yes | Yes | Default, datatype, or null option MISMATCH | MODIFY COLUMN (Flag slow alters, data impact if relevant) |
| Index | Index type + columns | Yes | No | | ADD INDEX |
| | | No | Yes | | DROP INDEX |
| | | Yes | Yes | Name MISMATCH | RENAME INDEX |
| | | Yes | Yes | Owner and Name, or owner MISMATCH | DROP INDEX; CREATE INDEX |
| Primary Key | (if primary key exists) | Yes | No | | CREATE CONSTRAINT |
| | | No | Yes | | DROP CONSTRAINT |
| | | Yes | Yes | Owner or columns MISMATCH | DROP CONSTRAINT; CREATE CONSTRAINT |
| Unique Key | Constraint name | Yes | No | | CREATE CONSTRAINT |
| | | No | Yes | | DROP CONSTRAINT |
| | | Yes | Yes | Owner or columns MISMATCH | DROP CONSTRAINT; CREATE CONSTRAINT |
| Trigger | Trigger name | Yes | No | | CREATE TRIGGER |
| | | No | Yes | | DROP TRIGGER |
| | | Yes | Yes | SQL checksum MISMATCH | DROP TRIGGER; CREATE TRIGGER |
| Foreign Key | Constraint Name | Yes | No | | CREATE CONSTRAINT |
| | | No | Yes | | DROP CONSTRAINT |
| | | Yes | Yes | Owner, parent table, or columns MISMATCH | DROP CONSTRAINT; CREATE CONSTRAINT |

FIG. 3

SYSTEMS AND METHODS FOR SYNCHRONIZING DATABASE SCHEMA

RELATED APPLICATION

The present application claims the benefit of U.S. Provisional Application No. 62/404,349 filed Oct. 5, 2016, which is hereby incorporated herein in its entirety by reference.

TECHNICAL FIELD

The present disclosure relates to the field of database administration, in particular to the synchronization of database schema.

BACKGROUND

In many database applications, it is preferable for multiple separate database instances to share a common data structure, or schema. This allows developers and maintainers of tools that interact with databases to make efficient assumptions about the database structure based on a known baseline.

As used through this disclosure, a database is a structured set of data held in a computer. Database software provides functionalities that allow building, modifying, accessing, and updating both databases and the underlying data. Databases and database software reside on database servers. Database servers are collections of hardware and software that provide storage and access to the database and enable execution of the database software.

A common task for database administrators therefore is updating the data structures of multiple database instances to match a "gold" or "master" data schema. This task can be performed manually, via the software interfaces provided by various database systems, or can be automated by the execution of data definition language (DDL) scripts that perform the necessary tasks to modify the schema of a target system. Generally, it is also necessary to create "back out" scripts, which can roll back any of the schema changes in the case of problems.

In many cases, DDL scripts are generated manually, taking into account the current schema in place on each of the target systems. In large environments, this could involve the creation of hundreds of separate scripts. It is therefore desirable to provide a more agile, automated solution to better handle schema updates.

In addition, it is also desirable for database administrators to be able to maintain version controlled definitions of data schema, so that database instances can be efficiently configured with older or newer versions of a given schema for testing, back up, or regression purposes.

SUMMARY

Embodiments of the present disclosure include methods and systems for synchronizing the database schema (or data structure) of a source database to a target database. A source data structure definition is generated, including definitions of each object in the source database structure. In embodiments, the object definitions include one or more of a name, a type, a size, a storage space name, or a locale indicator. A target database structure is generated, including definitions of each object in the source database structure. Object definitions are compared between the source database structure and the target database structure. Creation actions are generated for each object definition that does not have a corresponding object in the target database structure. Modification actions are generated for each object definition that differs from a corresponding object in the target database structure. Deletion actions are generated for each object in the target database structure that does not have a corresponding object definition. A data definition language change instruction sequence is generated from the creation actions, modification actions, and deletion actions that, when executed, will modify the target database structure to correspond to the data structure definition. The change instruction sequence is executed on the target database. An output regarding a status of the executing of the change instruction sequence is provided.

In embodiments, the data structure definition is associated with a database structure version.

In embodiments, a set of data items in the target database that will be affected by the one or more change instructions or one or more deletion instructions is determined, which is reported to the user in embodiments. In embodiments, requesting confirmation is requested from the user before generating the change instruction sequence.

In embodiments, a difference count is determined from the change instruction sequence and decremented the difference count for each change instruction executed. In embodiments, the current difference count is reported to the user.

In embodiments, a data definition language back out instruction sequence is generated from the change instruction sequence whereby executing the back out instruction sequence will reverse any changes made by execution of the change instruction sequence.

In embodiments, the change instruction sequence is generated in an optimized order to prevent failure of the execution of the change instruction sequence.

In embodiments, the modification instructions for each object definition that differs from a corresponding object in the target database by name include a temporary renaming instruction to modify the name of the corresponding object in the target database to a temporary name and a final renaming instruction to modify the name of the corresponding object in the target database to the name of the object definition. In embodiments, the change instruction sequence is generated to execute all temporary renaming instructions before any final renaming instructions.

In embodiments, a database structure update system for updating a target database structure of a target database based on a source data structure of a source database, includes a data structure definition extractor communicatively coupled to the source database and target database and configured to generate a data structure definition, the data structure definition having an object definition for each of the one or more objects of the source data structure.

In embodiments, the system further includes a comparator communicatively coupled to the target database and configured to receive the data structure definition, compare each object definition to the one or more objects in the target database structure and to generate creation, modification and deletion instructions.

In embodiments, the system further includes a data definition language generator configured to generate a data definition language change instruction sequence from the generated creation actions, modification actions, and deletion actions and a deployment engine communicatively coupled to the target database and to a user interface and configured to execute the change instruction sequence on the target database, and to provide an output to the user interface regarding the status of the execution of the change instruction sequence.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 3 is a table listing object types, their comparison attributes, and actions, according to an embodiment.

Figure 1:
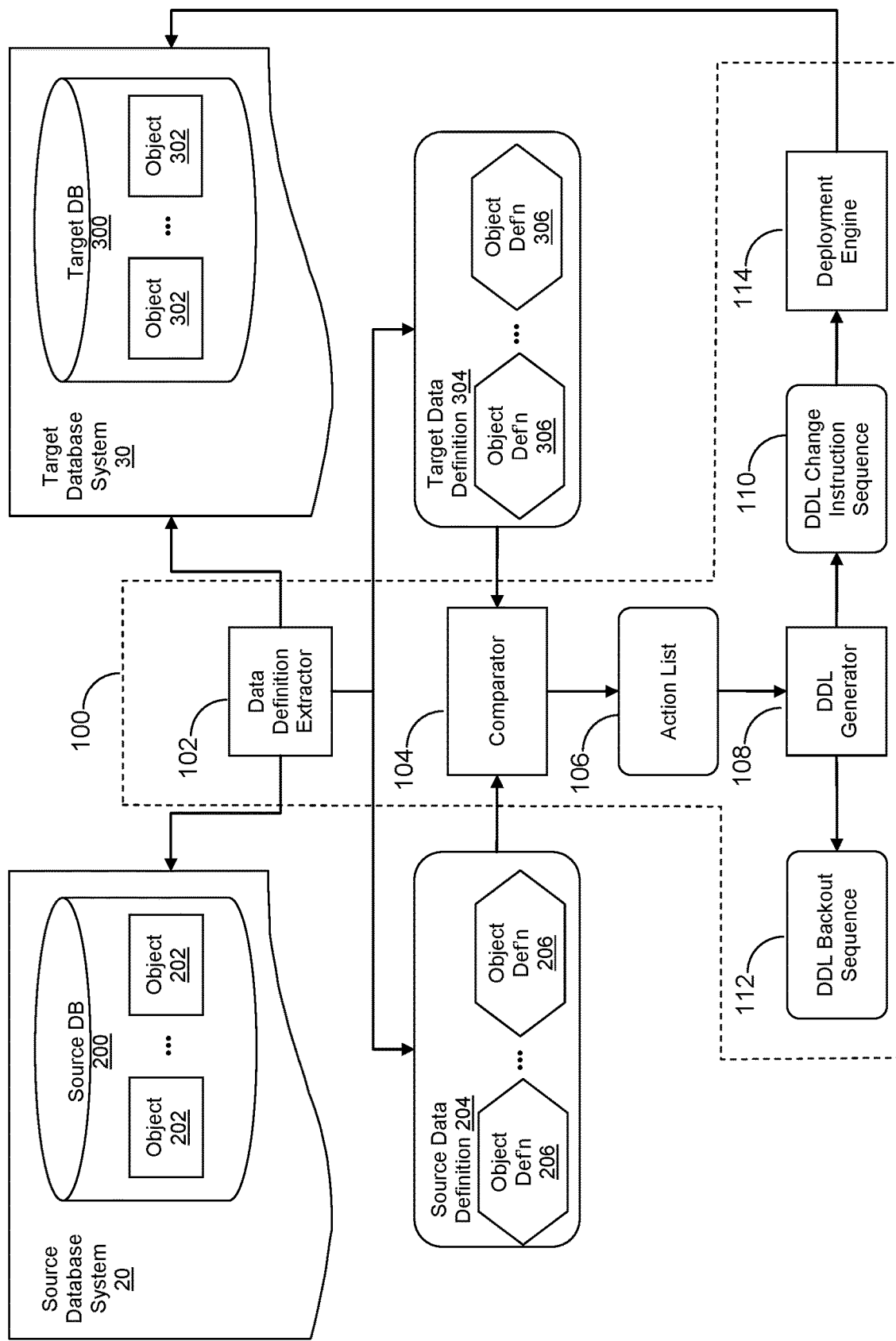
FIG. 1 is a block diagram depicting a database schema replication system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a block diagram depicting components of a database schema replication system 100 and interactions with a source database 200 residing on a source database system 20 and a target database 300 residing on a target database system 30 according to an embodiment. In embodiments, system 100 can be further operatively connected to a user interface (not shown) in order to receive input and provide outputs. The user interface can be a command line, a graphical user interface, or a programmatic interface such as an API or DLL allowing control of system 100 by other software systems and components.

As will be described, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but also to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As an example, a database schema replication system 100, source database 200, and target database 300 may be present on a single computing device in an embodiment. In other embodiments, source database 200 and target database 300 may be present on one or more database systems physically separate from a database schema replication system 100. In other embodiments, components of a database schema replication system 100 may be present on multiple separate computing devices. In embodiments, each of source database 200 and target database 300 may be relational databases with tabular structure, or NoSQL or other non-relational databases with key-value, grid, or other structures.

Source database 200 includes a schema, which defines one or more source objects 202 that make up the data structure of source database 200. Typical object types include: Databases, Tables, Views, Synonyms, Sequences, Foreign Keys, and Procedures. In addition, objects such as tables may include a number of sub-objects such as Columns, Indexes, Binary Indexes, Primary Keys, Unique Keys, and Triggers. Data definition extractor 102 is configured to read the schema of source database 200 and produce source data definition 204.

Figure 2A:
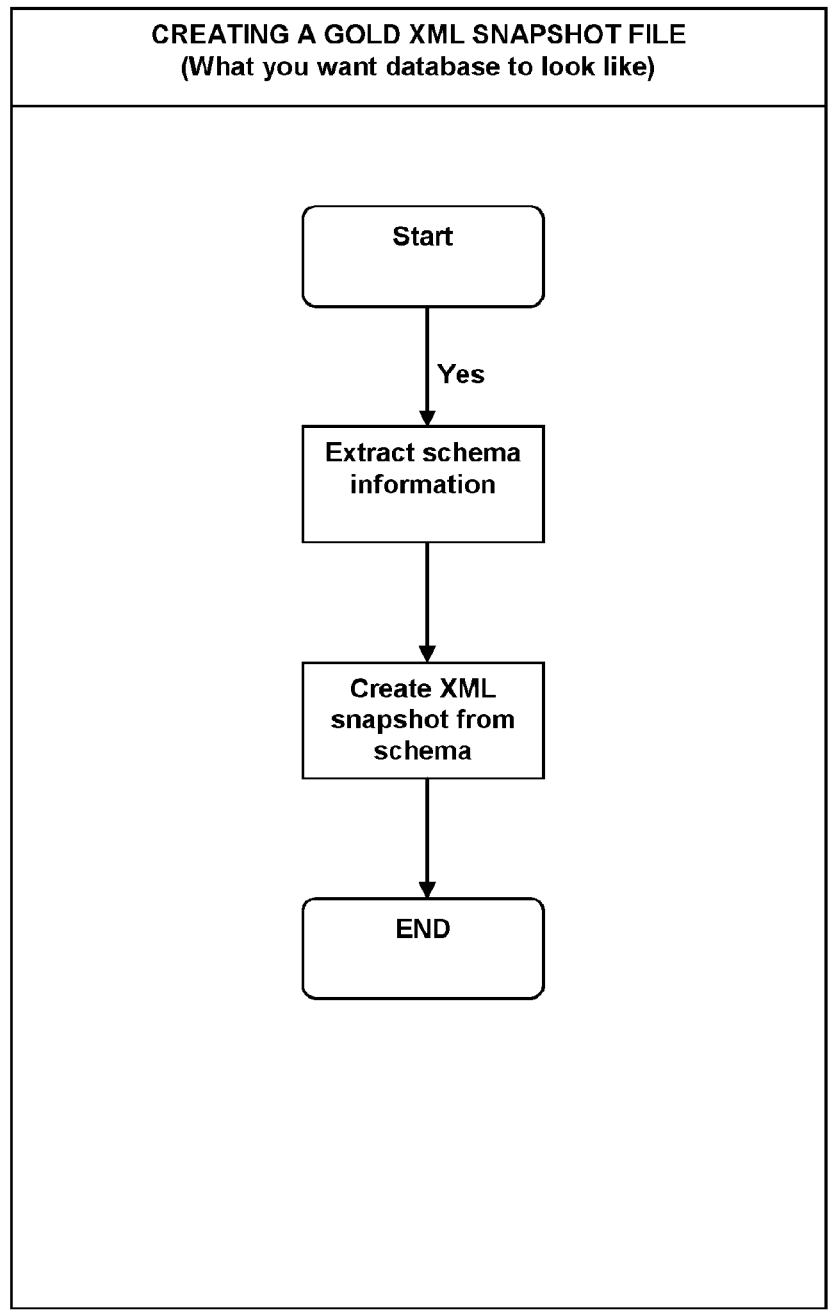
FIG. 2A is a flowchart depicting a method for creating a data structure definition, according to an embodiment.

Source data definition 204 includes an object definition 206 corresponding to each source object 202. Each object definition 206 includes the information required to replicate that object in the schema of another database. In embodiments, object definition 206 can include the following data items: name, type, size, locale indicators (for example Unicode, or non-Unicode for Database objects), and definitions of sub-objects. In embodiments, object definition 206 may include data items related to the physical storage of the object, for example storage space names, and fragmentation information regarding how objects are split across storage spaces. Where storage information is included, object definition 206 includes the information required to ensure that target database 300 has adequate storage for the objects of source data definition 204. In embodiments, source data definition 204 may be stored as one or more XML files, text files, or any other suitable data storage format. In embodiments, source data definition 202 may be stored as in persistent memory or in random access memory as required. FIG. 2A is a flowchart depicting a method 400 for production of source data definition 202. In embodiments, source data definition 202 may be provided as an input to database schema replication system 100.

Those of ordinary skill in the art will appreciate that data definition extractor 102 and method 400 can also be used to produce target data definition 304 from the schema of target database 300 in embodiments. Target data definition 304 would then include target object definitions 306, defining target objects 302. Target object definitions can have similar structure and data to source object definitions 206.

Figure 2B:
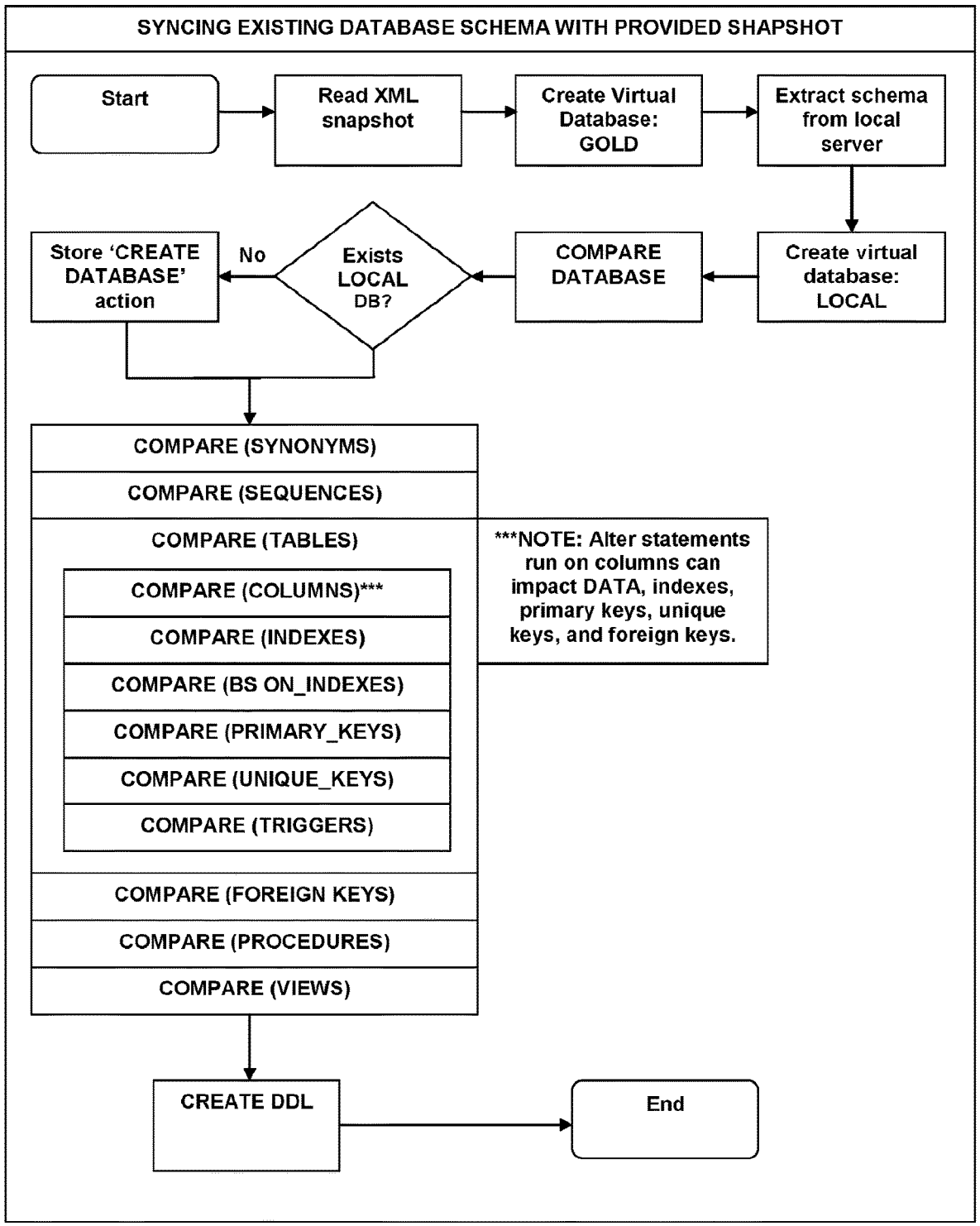
FIG. 2B is a flowchart depicting a method for creating a change instruction sequence, according to an embodiment.

Comparator 104 generates an action list 106 containing a list of actions that, when taken will update the structure of target database 300 to match source data definition 302. In embodiments, comparator 104 takes as input source data definition 204 and target data definition 304. As can be seen in FIG. 2B, where target database 300 does not yet exist, compactor 104 can store a CREATE DATABASE action. Comparator 104 can then walk through each source object definition 206 target object definition 306 and determine the appropriate action. Because data definitions 204 and 304 are likely to be nested, comparator 104 can employ any of the known tree traversal algorithms such as depth-first searching, breadth-first searching, Monte Carlo searching, or others known in the art to efficiently cover both data definitions 204 and 304. Comparator 104 can compare object definitions 206 and 306 based on object name, type, parameters, checksums, or other attributes.

FIG. 3 is a table including comparison attributes, criteria, and actions added to action list 106 for each mismatch, according to an embodiment.

Figure 4:
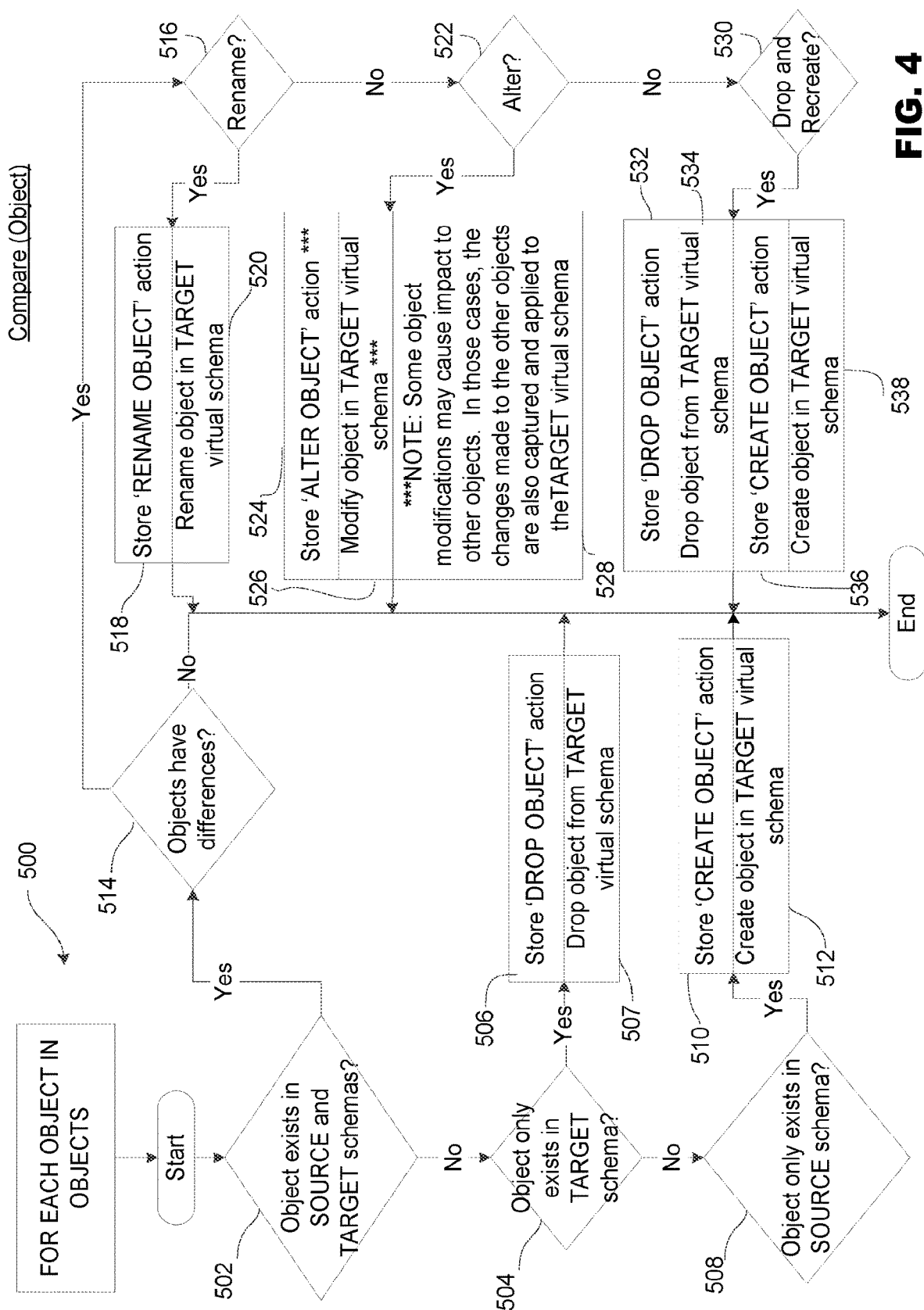
FIG. 4 is a flowchart depicting a method for creating an action list, according to an embodiment.

FIG. 4 is a flowchart depicting a method 500 that can be used in embodiments to generate action list 106. Each action in action list 106 all of the information required to complete the action 106, which can include all or part of object definitions 206 and 306. Method 500 can be repeated for each object in data definitions 204 and 304.

At 502, it is determined if the object exists in both the source data definition 204 and target data definition 304, based on the appropriate comparison attribute(s) as listed in FIG. 4. If not, at 504, if the object exists only in the target data definition 304, a "DROP OBJECT" action is stored in action list 106 at 506 the object is removed from target data definition 304 at 507. If the object exists only in source data definition 204 at 508, then a "CREATE OBJECT" action is stored in action list 106 at 510 and a definition of the object is added to target data definition 304.

If the object exists in both source data definition 204 and target data definition 304, and the objects are different at 514, the specific differences are evaluated to determine the appropriate action(s). If, at 516, the object has a different name, a "RENAME OBJECT" action is stored in action list 106 at 518 and the object is renamed in target data definition 304 at 520. If, at 522, the object requires modification, an "ALTER OBJECT" action is stored in action list 106 at 524, and the object is modified in target data definition 304 at 526. In some cases, a modification to an object may have an impact on other objects. For example an alter action performed on a Column may impact one or more Indexes, Primary Keys, Unique Keys, and/or Foreign Keys, or a drop action performed on a Primary Key may impact one or more referencing foreign keys), in those cases, the actions required to update the affected objects are also stored and applied to target data definition at 528.

If, at 530, the object needs to be dropped and recreated in the target database, a "DROP OBJECT" action is stored at 532, the object is removed from target data definition 304 at 534, a "CREATE OBJECT" action is stored at 536, and the object is created in the target data definition 304 at 538. In embodiments, drop and recreate actions may be chosen over alter actions where an alter action may result in a slow alteration in target database system 30 (as described below).

DDL generator 108 can use action list 106 to produce a data definition language change instruction sequence 110. Change instruction sequence 110 can be stored in a DDL file 600 that contains one or more change instructions in a data definition language such as Structured Query Language (SQL) or XML Schema (XSD).

In embodiments, DDL generator 108 can provide special handling for some actions. For example, where supported by target database system 30, DDL generator 108 can request that CREATE actions for object of type CONSTRAINT be performed without validation of the constraint (for example, by setting a novalidate flag). This can allow target database system 30 to perform the creation more efficiently.

Those of ordinary skill in the art will appreciate that certain actions including dropping tables and columns may result in data impact. In embodiments, a data impact flag can be set if action list 106 includes actions that will result in to dropping an object of type Table or Column. In embodiments, the potential data impact flag can be set only if the Table or Column in target database 300 to be dropped contains data. In embodiments, details of the data items impacted can be reported via the user interface.

In embodiments, a slow alteration flag can be set if action list 106 includes actions that will result in target database system 30 performing a slow alteration algorithm. In embodiments where target database system 30 includes a third party database server such as IBM Informix 12.10, the slow alteration flag can be set if action list 106 includes any of the following actions:

ADD actions for Columns with LVARCHAR, BLOB, or UDR data types;

ADD, ALTER, or DROP actions for Columns on Tables containing Columns with LVARCHAR, BLOB, or UDR data types; or ALTER actions for Columns that change data types and do not meet any of the following criteria for a fast alteration: increasing the length of a Column where the data type is a character type, decimal, or money; changing SMALLINT to INTEGER, BIGINT, INT8, DECIMAL(x,y) where x−y>=5, SMALLFLOAT, FLOAT, CHAR(x) where x>=6; INT to INT8, DEC(x, y) where x−y>=10, SMALLFLOAT, FLOAT, CHAR (x) where x>=11; changing SERIAL to INT8, DEC(x, y) where x−y>=10, SMALLFLOAT, FLOAT, CHAR (x) where x>=11, BIGSERIAL, SERIAL8; SERIAL8 to BIGSERIAL; BIGSERIAL to SERIAL; changing DEC(x,y) to SMALLINT where x−y<5 and y=0, INTEGER where x−y<10 and y=0, INT8 where x−y<20 and y=0, SERIAL where x−y<10 and y=0, BIGSERIAL/SERIAL8 where x−y<20 and y=0, DECIMAL(x2,y2) where x2−y2>=x−y and y2>=y, SMALLFLOAT, FLOAT, CHAR(x) where x>=8; changing SMALLFLOAT to DEC(x), FLOAT, CHAR(x) where x>=8; changing FLOAT to DEC(x), SMALLFLOAT, CHAR(x) where x>=8; or changing CHAR(x) to CHAR(x2) where y>=x.

In embodiments, other criteria for setting the slow alteration flag can be used based on the configuration of target database system 30.

Figure 5:
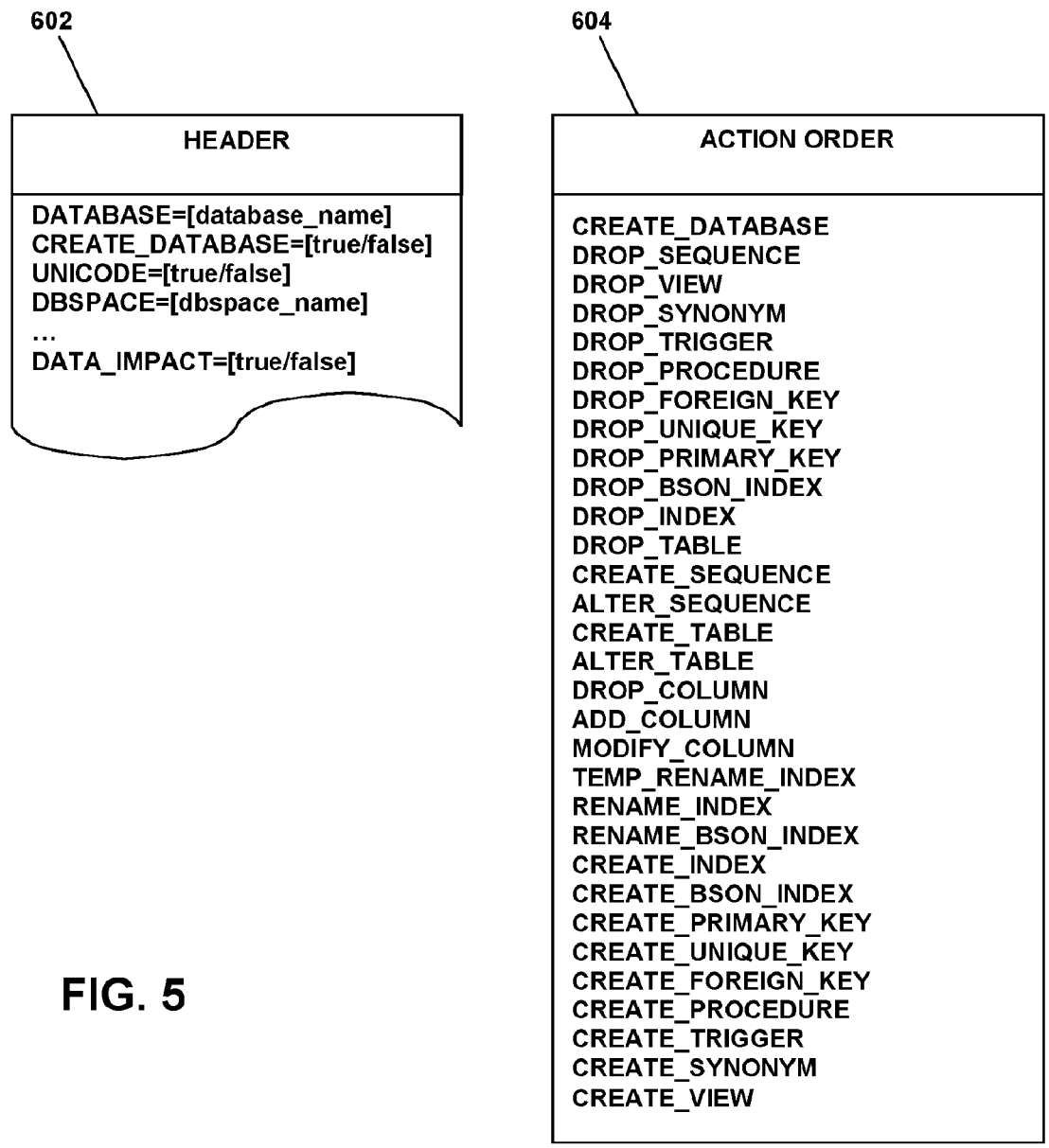
FIG. 5 is a block diagram depicting a change instruction sequence header and action order, according to an embodiment.

FIG. 5 is a block diagram depicting an example header 602 for DDL file 600. In embodiments, header 602 can include one or more data elements describing the overall schema replication operation, such as the name of the database, whether the database needs to be created, whether the database uses Unicode, the names of the storage spaces affected, and whether or not the actions in action list 106 have the potential to cause data impact or slow alterations. In embodiments, data impact can be indicated in the header if no data impact occurs but slow alterations occur.

FIG. 5 also depicts an optimized action order 604, which can avoid problems that could be caused by attempting to perform actions on objects that have not yet been created. For example, per action order 602, all "CREATE" actions for Table objects are complete before the creation of Primary Key objects that rely on the tables. In embodiments, therefore, DDL generator 108 generates change instruction sequence 110 to comply with action order 604.

In embodiments, DDL generator 108 can also generate DDL back out instruction sequence 112, that when executed can revert the changes made by the execution of change instruction sequence 110.

In embodiments, deployment engine 114 can initiate the execution DDL change instruction sequence 110 on target database system 30 via the interfaces provided by target database system 30. In embodiments, deployment engine 114 can initiate each change instruction of change instruction sequence 110 individually. In embodiments, deployment engine 114 can initiate batches of one or more change instructions simultaneously. In embodiments, deployment engine 114 can ensure that prerequisites are in place, perform error handling, alerting, logging, retry logic, and disconnecting applications from the database so changes can be applied. In embodiments, deployment engine 114 can control execution of other components of database schema replication system 100 in order to direct creation of change instruction sequence 110 and back out sequence 112.

In embodiments, deployment engine 114 can provide an output indicating that execution of change instruction sequence 110 will result in data loss or slow alterations. In embodiments, deployment engine 114 can wait for user input before proceeding.

In embodiments, deployment engine 114 can ensure that the necessary storage spaces have been created before execution of change instruction sequence 110. Deployment engine 114 can determine a difference count from change instruction sequence 110. Deployment engine 114 can decrement the difference count for each change instruction successfully executed. In embodiments, deployment engine 114 can report the current different count to the user interface.

During execution of change instruction sequence 110, deployment engine 114 can handle errors reported by target database system 30. When an error occurs, deployment engine 114 can automatically retry change instruction sequence 110. In embodiments, deployment engine 114 can initiate regeneration of target data definition 304, and initiate the execution of method 500 to produce a new action list 106 and change instruction sequence 110. In this way, partial synchronizations can be recovered, because the new target data definition 304 will reflect changes made during the previous execution. In embodiments, deployment engine 114 can compare the difference count after every retry, and, if the difference count is unchanged report the failure to the user.

In embodiments, deployment engine 114 can allocate the space necessary for objects created and modified in change instruction sequence 110 before execution of change instruction sequence 110. In other embodiments, deployment engine 114 can initiate execution of change instruction sequence 110 before allocate space, and only examining allocation if an error occurs. In embodiments, deployment engine can determine if any storage spaces on target database system 30 are above a capacity threshold, and initiate allocation of more space for those storage spaces. In embodiments, the capacity threshold can be about 87%.

Those of ordinary skill in the art will appreciate that database schema replication system 100 can be configured to update more than one target database 300. In embodiments, a single source data definition 204 can be generated, which can be used as input to comparator 104 against multiple target databases 300. Execution of DDL generator 108 and deployment engine 114 can then proceed for each target database 300. In embodiments, source data definition 204 can be copied to each target database system 30 in preparation for processing by database schema replication system 100 on each target database system 30. In embodiments, source data definition 204 can reside in a central location and accessed separately for each target database 300.

An advantage of the current disclosure is that source data definition 204 can act as a database schema version. In embodiments in which source data definition 204 is stored as a file, each database schema version can then be managed using various version control systems known in the art. Those of ordinary skill in the art will appreciate that this is a significant advantage over system in which database changes are represented by a collection of delta change documents. In complex systems and organizations, hundreds of delta change documents may need to be created for each database change. Manually created delta change documents, can contain errors and fail to represent all of the changes that should have been made to the database. In the current disclosure, each source data definition file represents the entire database schema after all changes have been applied so all changes to a structure are captured. This can further save the design team from having to manually document individual schema changes.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for updating a target database structure of a target database based on a source data structure of a source database, the target database structure and the source database structure each having one or more objects, the method comprising:
generating a data structure definition, the data structure definition having an object definition for each of the one or more objects of the source data structure;
comparing each object definition to the one or more objects in the target database structure;
generating one or more creation actions for each object definition that does not have a corresponding object in the target database structure;
generating one or more modification actions for each object definition that differs from a corresponding object in the target database structure;
generating one or more deletion actions for each object in the target database structure that does not have a corresponding object definition;
generating a data definition language change instruction sequence from the generated creation actions, modification actions, and deletion actions that, when executed, will modify the target database structure to correspond to the data structure definition;
executing the change instruction sequence on the target database; and
providing an output regarding a status of the executing of the change instruction sequence.

2. The method of claim 1, further comprising:
determining a set of data items in the target database that will be affected by the one or more change actions or one or more deletion actions.

3. The method of claim 2, further comprising:
reporting the set of data items in the target database that will be affected by the one or more change actions or one or more deletion actions to a user, and requesting confirmation from the user before generating the change instruction sequence.

4. The method of claim 1, further comprising:
determining a difference count from the change instruction sequence,
wherein executing the change instruction sequence on the target database includes decrementing the difference count for each change instruction executed; and further wherein providing an output regarding the status of the execution of the change instruction sequences includes reporting the current different count.

5. The method of claim 1, further comprising:
generating a data definition language backout instruction sequence from the change instruction sequence whereby executing the backout instruction sequence will reverse any changes made by execution of the change instruction sequence.

6. The method of claim 1, wherein the change instruction sequence is generated in an optimized order to prevent failure of the execution of the change instruction sequence.

7. The method of claim 1, wherein each of the one or more object definitions includes one or more of a name, a type, a size, a storage space name, or a locale indicator.

8. The method of claim 7, wherein the modification instructions for each object definition that differs from a corresponding object in the target database by name include a temporary renaming action to modify the name of the corresponding object in the target database to a temporary name and a final renaming action to modify the name of the corresponding object in the target database to the name of the object definition.

9. The method of claim 8, wherein the change instruction sequence is generated to execute all temporary renaming actions before any final renaming actions.

10. The method of claim 1, wherein the data structure definition is associated with a database structure version.

11. A database structure update system for updating a target database structure of a target database based on a source data structure of a source database, the target database structure and the source database structure each having one or more objects, the system comprising:
a data structure definition extractor communicatively coupled to the source database and configured to generate a data structure definition, the data structure definition having an object definition for each of the one or more objects of the source data structure;

a comparator communicatively coupled to the target database and configured to receive the data structure definition, compare each object definition to the one or more objects in the target database structure, and to:
generate one or more creation actions for each object definition that does not have a corresponding object in the target database structure,
generate one or more modification actions for each object definition that differs from a corresponding object in the target database structure, and
generate one or more deletion actions for each object in the target database structure that does not have a corresponding object definition;
a data definition language generator configured to generate a data definition language change instruction sequence from the generated actions instructions, modification actions, and deletion actions that, when executed will modify the target database structure to correspond to the data structure definition; and
a deployment engine communicatively coupled to the target database and to a user interface and configured to execute the change instruction sequence on the target database, and to provide an output to the user interface regarding the status of the execution of the change instruction sequence.

12. The system of claim 11, wherein the comparator is further configured to determine a set of data items in the target database that will be affected by the one or more change actions or one or more deletion actions.

13. The system of claim 12, wherein the comparator is further configured to report the set of data items in the target database that will be affected by the one or more change actions or one or more deletion actions to the user.

14. The system of claim 11, wherein the comparator is further configured to determine a difference count from the change instruction sequence, and wherein the deployment engine is further configured to decrement the difference count for each change instruction executed; and further wherein providing an output regarding the status of the execution of the change instruction sequences includes reporting the current different count.

15. The system of claim 11, wherein the data definition language generator is further configured to:
generate a data definition language backout instruction sequence from the change instruction sequence whereby executing the backout instruction sequence will reverse any changes made by execution of the change instruction sequence.

16. The system of claim 11, wherein the change instruction sequence is generated in an optimized order to prevent failure of the execution of the change instruction sequence.

17. The system of claim 11, wherein each of the one or more object definitions includes one or more of a name, a type, a size, a storage space name, or a locale indicator.

18. The system of claim 17, wherein the modification instructions for each object definition that differs from a corresponding object in the target database by name include a temporary renaming action to modify the name of the corresponding object in the target database to a temporary name and a final renaming action to modify the name of the corresponding object in the target database to the name of the object definition.

19. The system of claim 18, wherein the data definition language generator is further configured to generate the change instruction sequence to execute all temporary renaming actions before any final renaming actions.

20. The system of claim 11, wherein the data structure definition is associated with a database structure version.

* * * * *